(12) United States Patent
Swift et al.

(10) Patent No.: US 6,970,144 B1
(45) Date of Patent: Nov. 29, 2005

(54) KIOSK FOR 3D DISPLAY

(75) Inventors: David C. Swift, Cortlandt Manor, NY (US); Michael Simpson, Ridgewood, NJ (US)

(73) Assignee: Vrex, Inc., Elmsford, NY (US)

( * ) Notice: Subject to any disclaimer, the term of this patent is extended or adjusted under 35 U.S.C. 154(b) by 643 days.

(21) Appl. No.: 10/003,372

(22) Filed: Nov. 15, 2001

Related U.S. Application Data

(60) Provisional application No. 60/249,354, filed on Nov. 16, 2000.

(51) Int. Cl.$^7$ ............................................. G09G 5/00
(52) U.S. Cl. ....................................................... 345/1.1
(58) Field of Search ................................ 359/374, 369; 463/46, 32; 250/211; 345/1.1, 1.2, 1.3, 2.12, 345/4, 905; 348/58

(56) References Cited

U.S. PATENT DOCUMENTS

| | | | |
|---|---|---|---|
| 5,982,536 A * | 11/1999 | Swan et al. ................... 359/400 |
| 6,211,927 B1 * | 4/2001 | Yamazaki et al. ............. 349/15 |
| 6,252,707 B1 * | 6/2001 | Kleinberger et al. ......... 359/465 |
| 6,359,664 B1 * | 3/2002 | Faris ............................. 349/15 |
| 6,449,090 B1 * | 9/2002 | Omar et al. .................. 359/465 |
| 6,552,850 B1 * | 4/2003 | Dudasik ....................... 359/501 |
| 6,603,504 B1 * | 8/2003 | Son et al. ...................... 348/54 |
| 6,765,545 B2 * | 7/2004 | Son et al. ........................ 345/7 |
| 2002/0089744 A1 * | 7/2002 | Myers .......................... 359/465 |

* cited by examiner

*Primary Examiner*—Chanh Nguyen
*Assistant Examiner*—Motilewa Good-Johnson
(74) *Attorney, Agent, or Firm*—Gerow D. Brill; Ralph J. Crispino

(57) ABSTRACT

The invention is an improved kiosk for a 3D display. A clear plastic or transparent band surrounds a μPol based 3D stereo flat panel LCD display system. The radius of the band is designed to provide the optimum viewing distance from all angles.

7 Claims, 1 Drawing Sheet

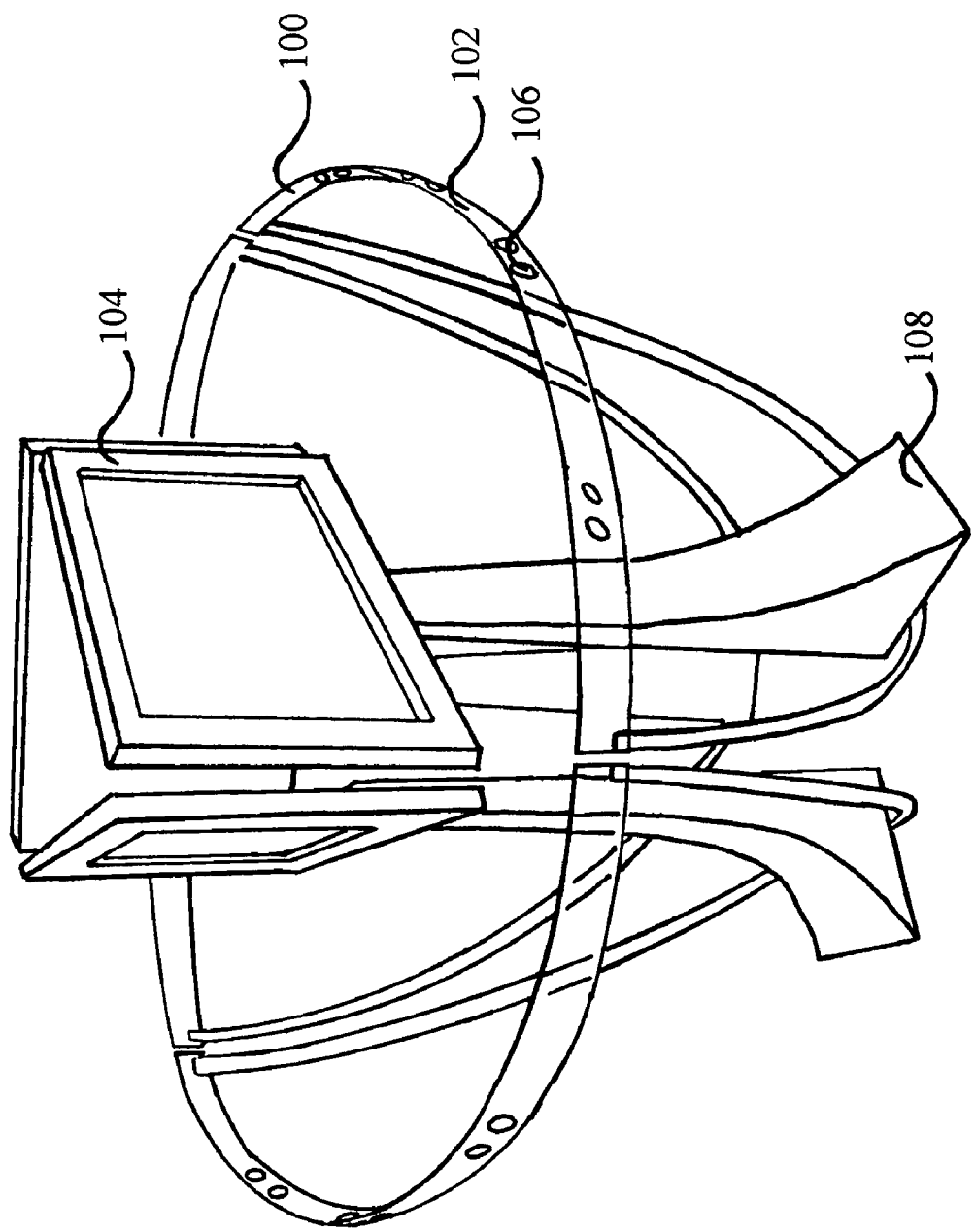
FIGURE

KIOSK FOR 3D DISPLAY

CROSS REFERENCE TO A RELATED APPLICATION

The present application is a non-provisional application of our Provisional Application Ser. No. 60/249,354 dated Nov. 16, 2000 entitled "An Improved Kiosk for 3D Display." This Provisional Application is hereby incorporated by reference.

BACKGROUND OF THE INVENTION

This invention relates to an improved kiosk for 3D display systems. Specifically, the improvement makes it possible to have a compact and ergonomic kiosk viewing system for multiple viewers.

Previous display systems use micro polarizing filters ($\mu$Pol™) for 3D display systems. The following patents describe the use of micro polarizing filters in 3D display systems and are incorporated by reference.

An invention by Sadeg M. Faris in U.S. Pat. No. 5,327,285 issued on Jul. 5, 1994 entitled "Methods of Manufacturing Micropolarizers" teaches the manufacturing of micropolarizers used in the improved kiosk system. U.S. Pat. No. 5,096,520 issued on Mar. 17, 1992 to Sadeg M. Faris teaches a method for producing high efficiency polarizing filters. U.S. Pat. No. 5,221,982 issued on Jun. 22, 1993 to Sadeg Faris discloses a polarizing wavelength separator. U.S. Pat. No. 5,691,789 issued on Nov. 25, 1997 to Sadeg M. Faris teaches a single layer reflective super broadband circular polarizer. U.S. Pat. No. 6,034,753 issued on Mar. 7, 2000 to Faris et al teaches the use of circular polarizing material have super broadband reflection and transmission characteristics. U.S. Pat. No. 6,111,598 issued on Aug. 29, 2000 to Sadeg Faris teaches a system and method for displaying spectrally multiplexed images of three dimensional imagery for use in flicker free stereoscopic viewing.

Using a $\mu$Pol filter on an LCD for a kiosk display is difficult because special viewing glasses are required. CRT and shutter glasses 3D systems have the same problem. One solution is to hang the glasses on a wire or attach them to a rod in front of the display. This solution only allows one viewer to see the display. Since a $\mu$Pol based 3D stereo flat-panel display has a very large viewing zone in the horizontal dimension, it is possible to have many viewers on the same horizontal plane viewing a 3D image. This invention provides a compact and ergonomic kiosk viewing system for multiple viewers.

BRIEF DESCRIPTION OF THE DRAWING

The FIGURE is a perspective view of an improved kiosk as described in the application.

SUMMARY OF THE INVENTION

The invention is an improved kiosk for a 3D display. A clear plastic or transparent band surrounds a $\mu$Pol based 3D stereo flat panel LCD display system. The radius of the band is designed to provide the optimum viewing distance from all angles.

DETAILED DESCRIPTION OF THE INVENTION

The invention is an improved kiosk 100 for a 3D display. A clear plastic or transparent band 102 surrounds a $\mu$Pol based 3D stereo flat panel LCD display system 104. The radius of the band is designed to provide the optimum viewing distance from all angles.

Attached to this band are one or more 3D viewing polarized filters 106 at periodic intervals. It is possible to support at least 5 viewers per display. A viewer simply puts his/her head up to the band and looks through the polarizing filters to see the 3D stereo images on the display. For cathode ray tube (crt) shutter based systems, it is possible to embed shuttering filters into the band for time sequential displays. The entire system is integrated into an ergonomic base unit that supports the 3D display and the band (as illustrated in the FIGURE). The base 108 is fashioned in such a way as to all mutiple units to be attached to form a complete or partial ring of 3D displays (as illustrated in the attached rendering). The 3D display may be include, but is not limited to, a CRT display, an LCD display or a projection screen upon which a 3D image is projected. The projection system may be a front projection system or a rear projection system.

Sensors (not shown) can be placed in the ring or near the display to sense the presence of a viewer and change from the 2D monoscopic display to a true 3D stereo display. This feature will allow a monoscopic image to be used as an attraction sequence and allow the 3D stereo images to be displayed when a user is actually looking at the display. This is important because 3D stereo images are nearly impossible to view and understand when they are not being viewing with the glasses.

Important factors to be considered with the improved kiosk system include: The kiosk supports multiple viewers without the need to manage glasses or have ugly strings/wires/rods supporting the glasses. Additionally the improved kiosk provides viewing at the optimum distance for the best 3D effect.

There is an improved ergonomic look of the improved kiosk that includes a viewer sensor that allows monoscopic attraction images to be displayed when viewers are not looking though the ring.

Persons skilled in the art will appreciate that the present invention can be practiced by other than the described embodiments, which are presented for purpose of illustration rather than limitation, and the present invention is limited only by the claims that follow.

What is claimed is:

1. A kiosk for 3D display comprising:
   a micro polarizer based 3D display system;
   a band surrounding at least a portion of said display system;
   one or more viewing polarized filters attached to or integral with said band; and
   an ergonomic base unit supporting said display system and said band wherein multiple combinations of display systems with said bands to form a complete or partial ring of said 3D displays.

2. The kiosk of claim 1 wherein said display comprises a CRT display.

3. The kiosk of claim 1 wherein said display comprises an LCD display.

4. The kiosk of claim 1 wherein said display comprises a projection screen upon which a 3D image is projected.

5. The kiosk of claim 4 wherein said projected image is part of a front projection system.

6. The kiosk of claim 4 wherein said display is part of a fear projection system.

7. The kiosk of claim 1 further comprising sensors on or near said transparent band for sensing the presence of a viewer.

* * * * *